Figure 15:
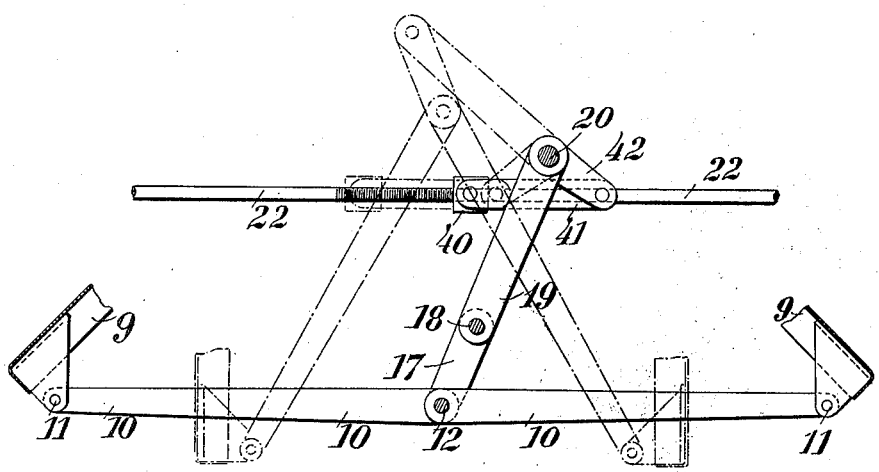

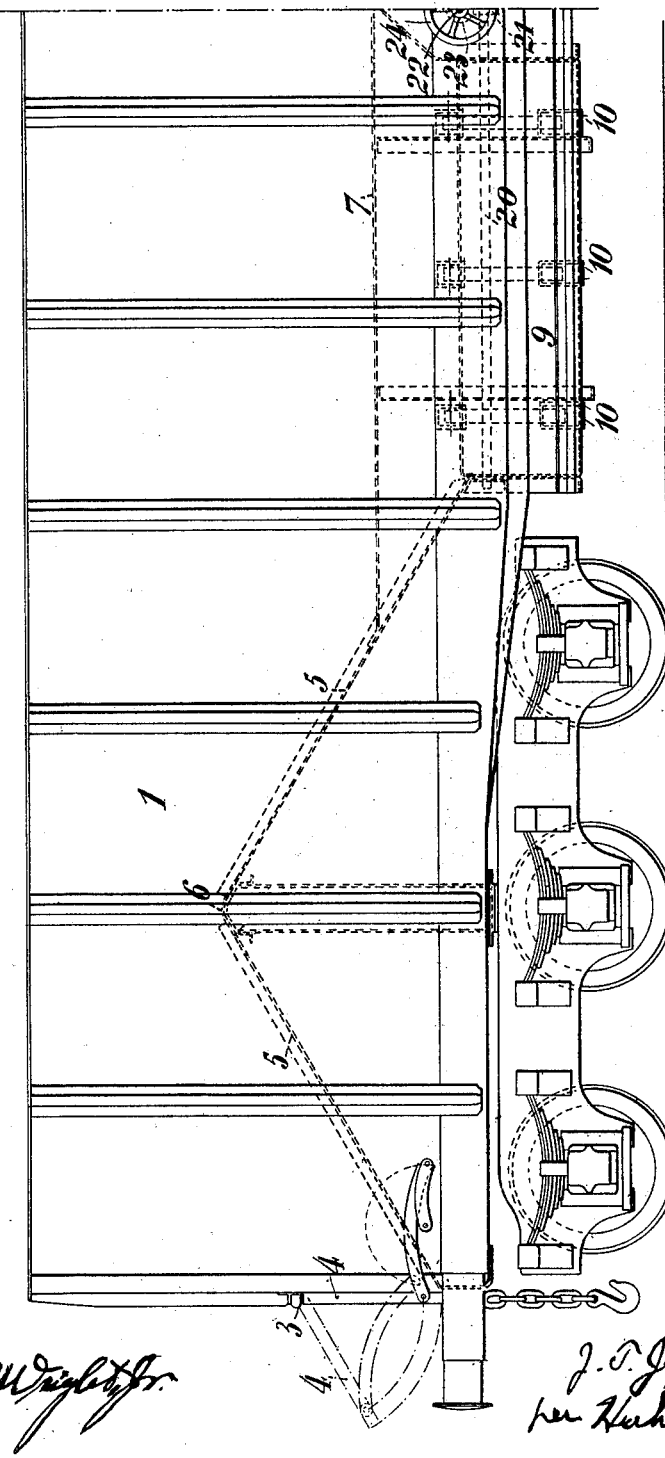

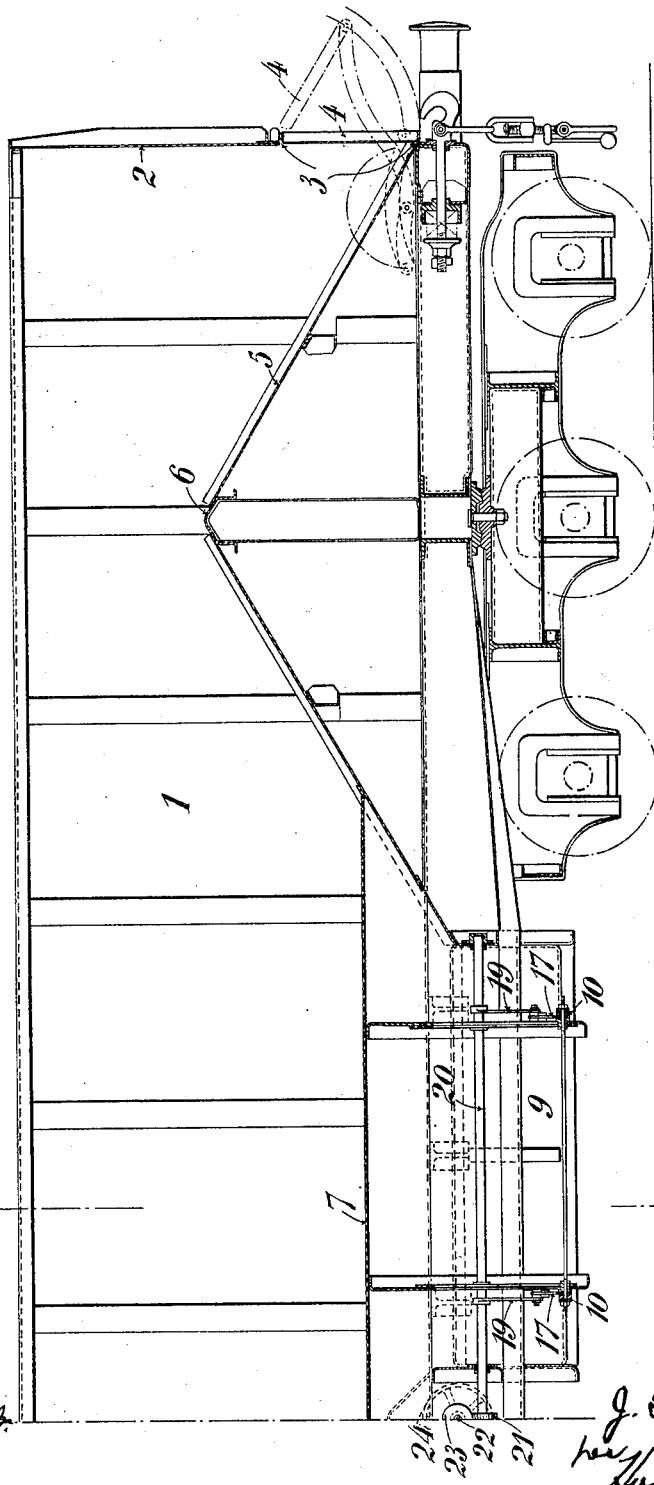

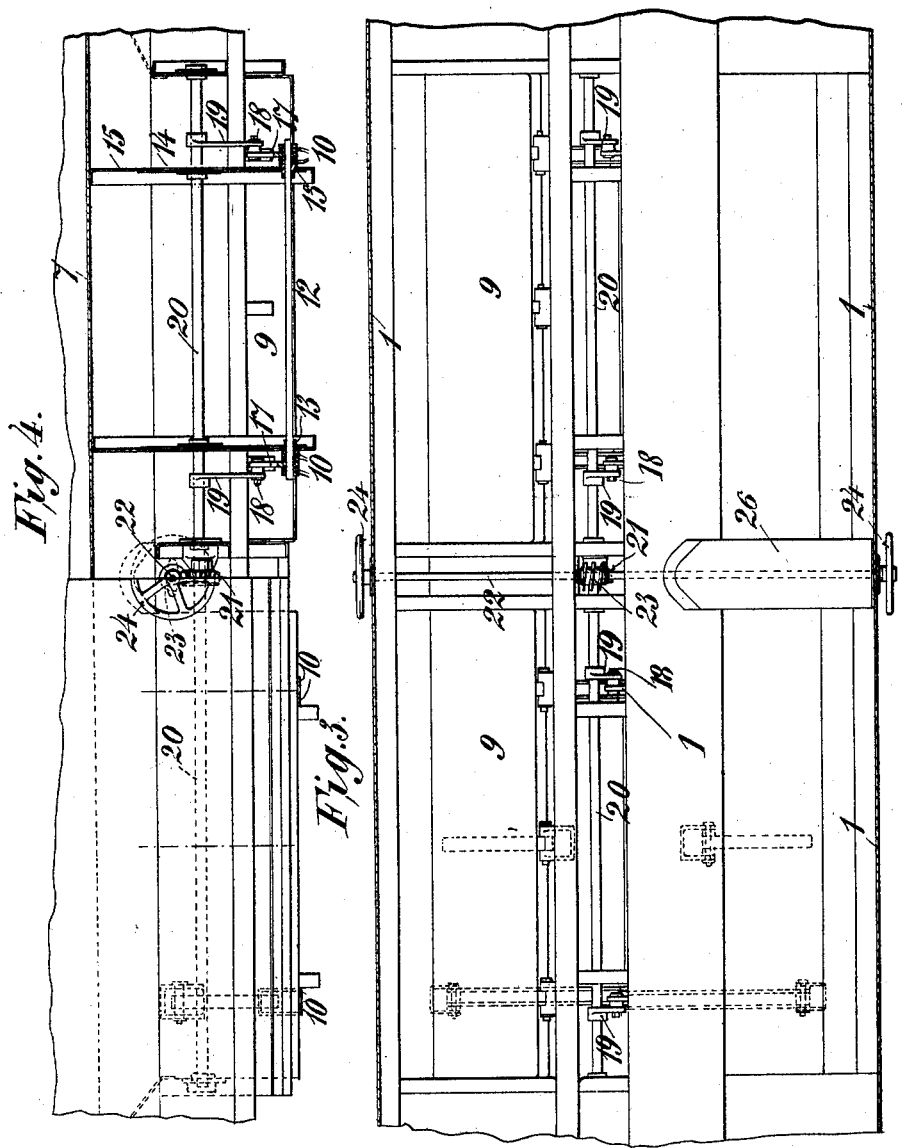

No. 757,931. PATENTED APR. 19, 1904.
J. T. JEPSON.
RAILWAY WAGON.
APPLICATION FILED MAY 25, 1903.
NO MODEL. 9 SHEETS—SHEET 4.
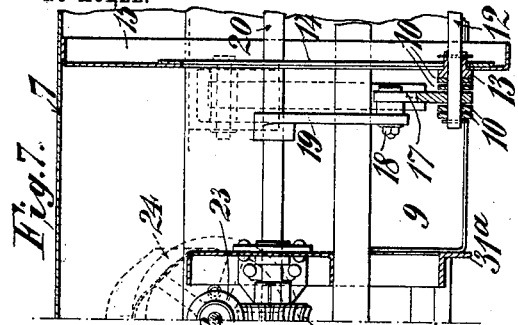
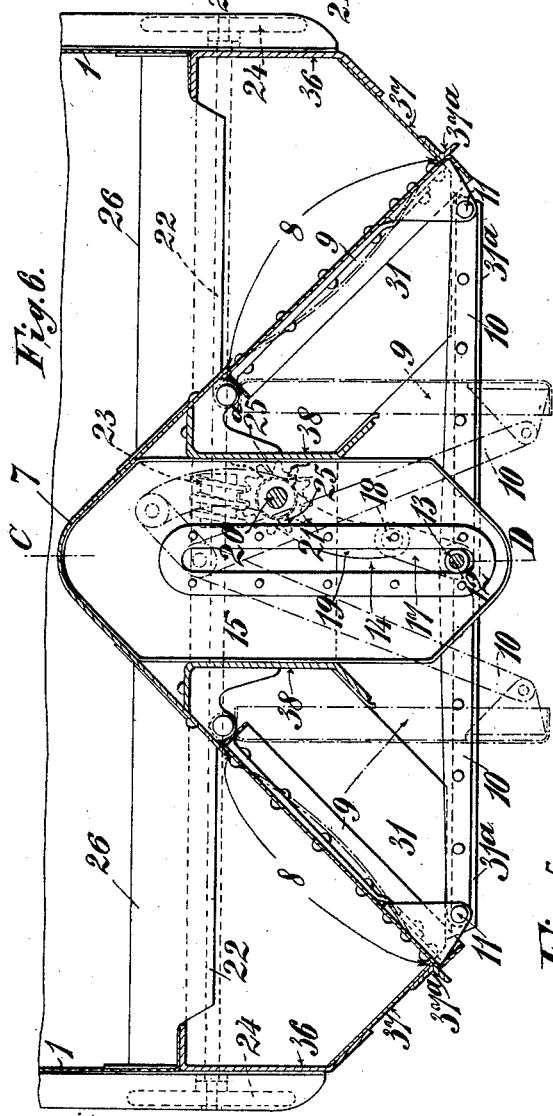
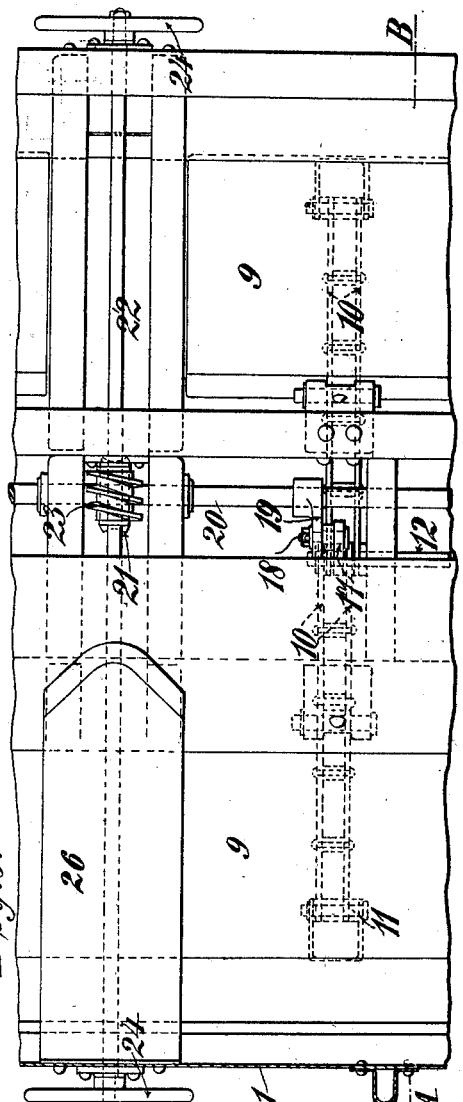

No. 757,931. PATENTED APR. 19, 1904.
J. T. JEPSON.
RAILWAY WAGON.
APPLICATION FILED MAY 25, 1903.
NO MODEL. 9 SHEETS—SHEET 5.
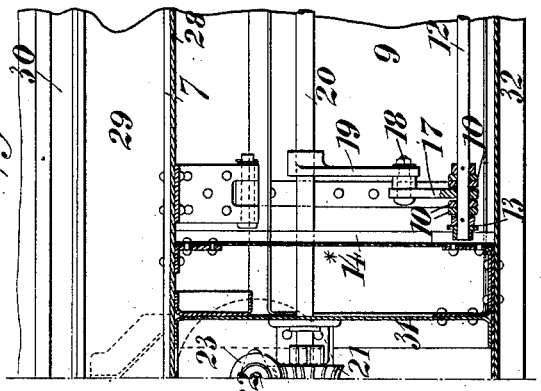
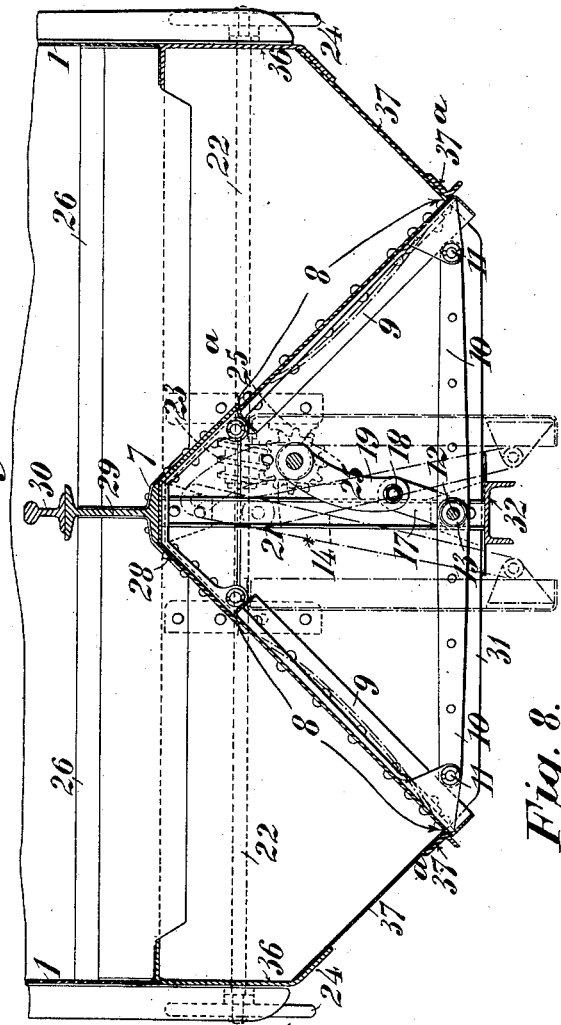
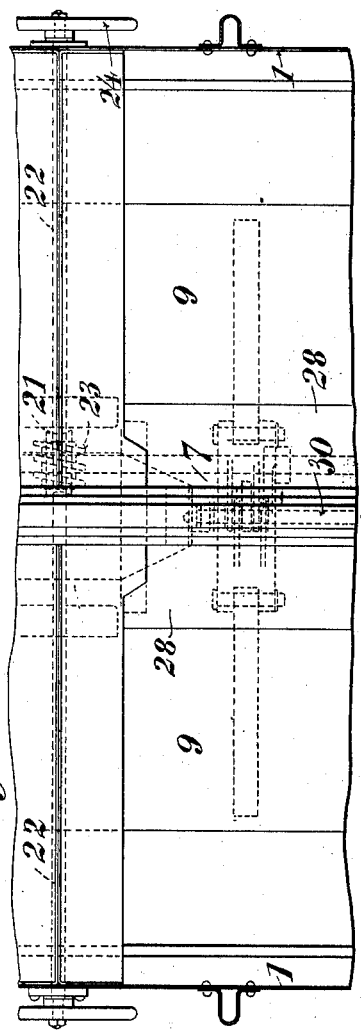

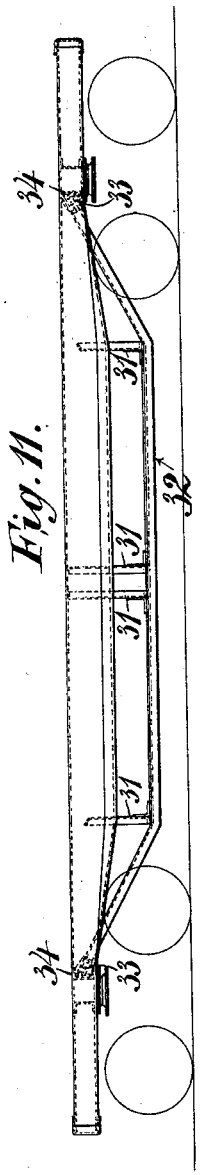

No. 757,931. PATENTED APR. 19, 1904.
J. T. JEPSON.
RAILWAY WAGON.
APPLICATION FILED MAY 25, 1903.
NO MODEL. 9 SHEETS—SHEET 7.
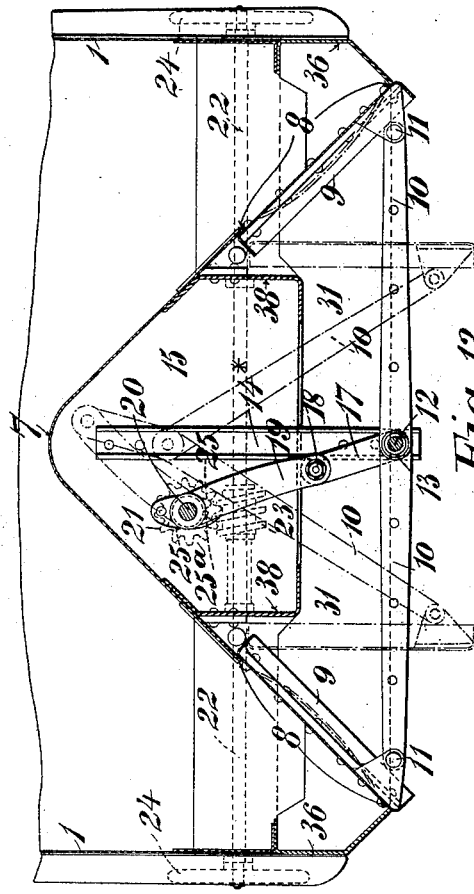
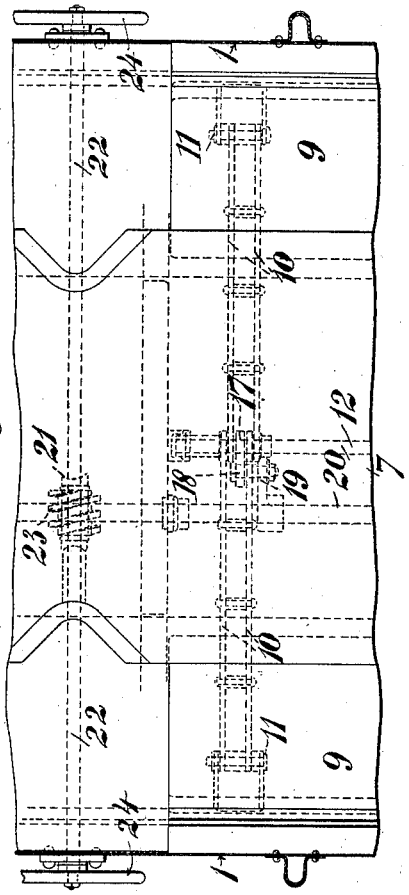
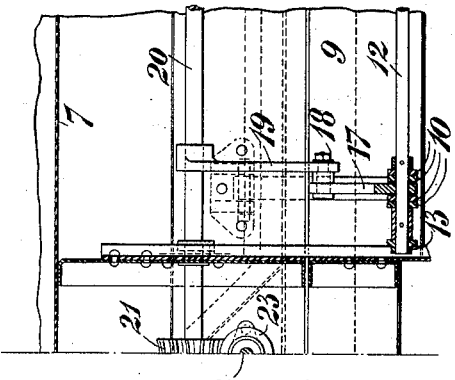
Witnesses:
E. R. Peck
Chas. P. Wright Jr.
Inventor
J. T. Jepson
per Herbert E. Peck atty No. 757,931. PATENTED APR. 19, 1904.
J. T. JEPSON.
RAILWAY WAGON.
APPLICATION FILED MAY 25, 1903.
NO MODEL. 9 SHEETS—SHEET 8.

No. 757,931. PATENTED APR. 19, 1904.
J. T. JEPSON.
RAILWAY WAGON.
APPLICATION FILED MAY 25, 1903.
NO MODEL. 9 SHEETS—SHEET 9.

No. 757,931. Patented April 19, 1904.

UNITED STATES PATENT OFFICE.

JAMES THOMAS JEPSON, OF LEEDS, ENGLAND.

RAILWAY-WAGON.

SPECIFICATION forming part of Letters Patent No. 757,931, dated April 19, 1904.

Application filed May 25, 1903. Serial No. 158,723. (No model.)

*To all whom it may concern:*

Be it known that I, JAMES THOMAS JEPSON, a subject of the King of Great Britain and Ireland, residing at Leeds, in the county of York, England, have invented Improvements in and Relating to Railway-Wagons, of which the following is a specification.

This invention has reference to improvements in and relating to hopper-bottom, bogie, and other wagons of various kinds in which material such as coal, ores, or grain is carried in bulk and is automatically discharged through openings formed in the wagon-bottoms and provided with doors mounted on hinges arranged longitudinally of the wagons; and the invention has reference more particularly to wagons of the kind forming the subject of my former application for Letters Patent, Serial No. 133,467, dated December 1, 1902. The door-openings may extend practically the full length of the wagon or only part of the length of the wagon, the other portions of which may then be inclined or hoppered, so that the whole of the material carried will fall toward the said openings or partly toward the said openings and partly toward others provided at the ends of the wagons, as described in the specification of my aforesaid former application for Letters Patent.

The bottom of the wagon is formed with a longitudinal ridge located near its transverse center or the middle of its width, and the sides of the edge have openings or doorways formed therein, the said openings or doorways extending only partly across the wagon from the middle of its width, the lateral portions of the floor of the wagon being then inclined or hoppered transversely from the sides to the openings or doorways, or the openings or doorways may be formed in the sides of the longitudinal ridge at or near the sides of the wagon, the ridge-walls above them then forming the floor of the wagon and sloping toward the openings or doorways, or the openings or doorways may extend from near the summit of the ridge to the sides of the wagon, so as to occupy practically the full width of the wagon. The doors for closing the openings or doorways are arranged back to back in pairs and when closed are inclined at an angle of forty-five degrees to the horizon, or thereabout, and ninety degrees, or thereabout, to each other. The doors of each pair are hinged at their upper adjacent edges and connected by toggles pivoted to a pin or pins fastened to each door near its lower edge and parallel with the hinge and which when forced into a practically horizontal or open attitude hold the doors closed. To the pin of the knuckle of the toggles is connected a short link, the other end of which is jointed by a pin to a lever-arm fixed to a longitudinal rock-shaft that is situated between the doors near the center of the wagon. This shaft may extend the full length of all doors controlling openings in the longitudinal ridge and has fixed upon it a worm-wheel engaged by a worm fixed to a transverse shaft, which extends to each side of the wagon and has fixed upon each of its ends a hand-wheel, or the ends of the transverse shaft are squared to receive a crank-handle or key. By turning the hand-wheel, crank-handle, or key at either side of the wagon the longitudinal shaft can be caused to rock slowly in the desired direction, so that its lever-arms will raise or lower the links connected to the knuckle of the toggles and open or close the doors, as desired. The pins of the knuckles of the toggles are extended into vertical guide-channels. Instead of worm-gear between the transverse and longitudinal shafts the former may be formed with a screw-thread, on which works a nut provided with trunnions that are connected by a pair of links and a pin to a short lever fixed onto the longitudinal shaft. On the transverse shaft being turned in either direction its screw will cause the nut to travel, and this through the links will rock the longitudinal shaft.

By the mechanism described several pairs of heavy doors can be operated with ease by turning the transverse shaft by means of the hand-wheel, crank-handle, or key at either side of the wagon. Owing to the use of the worm or screw the doors will always be under control and remain locked in any desired position, and to move them the hand-wheel must be turned. Furthermore, the doors may be operated with equal ease from either side of the wagon, and they may be opened by an operator at one side of the wagon and closed from the opposite side, or vice versa, thus avoiding the necessity for the operator passing underneath or round the wagon.

Suitable stops are provided to prevent the longitudinal shaft being turned through too great an angle, and thus damaging the mechanism. The stop may be a projection on the boss of the worm-wheel, which abuts against a fixed bracket when turned too far in either direction.

When a wagon is constructed for carrying heavy substances, such as crushed or powdered ores or any such like fine material, with an arrangement such as described the doors of wagon can be forced close upon or into their frames, where they are firmly held, thus preventing waste of the contents, a finer worm or screw being used, if desired. The doors may in some cases be actuated in pairs by two or more transverse worm shafts or screws. The transverse shaft is generally situated between the ends of two sets of doors and near the center of the wagon; but when the wagon is constructed so that the whole of the contents are discharged outside the rails upon which the wagon stands it may be more convenient to have the transverse shaft beyond and clear of the doors, so that the operator is out of reach of the material being discharged from the wagon.

If desired, instead of having a worm and worm wheel or screw and lever to operate the longitudinal shaft, this shaft and through it the doors may be actuated by air or liquid pressure. Thus the moving parts of one or more power-cylinders may be connected in a suitable manner to a lever or levers fixed in a convenient position to the longitudinal shaft and underneath some portion of the wagon-floor where the same is hoppered, and preferably near the end of the wagon.

When the doors are closed and the toggles in a practically horizontal or open attitude, the axes of the longitudinal shaft and of the pins connecting the ends of the links to their respective lever-arms and toggle-knuckles will be in the same plane, so that the doors when closed are absolutely locked and prevented from being opened in shunting operations, owing to the toggles being held practically in line and prevented from rising or falling by the shaft, lever, and link until the shaft is turned. This is desirable in all the arrangements, but is more particularly so when power is used to operate the doors, as otherwise air or liquid pressure would have to be retained in the cylinder or cylinders.

In hopper-bottom wagons with longitudinally-hinged doors special constructions of underframe are sometimes desirable. Thus where in order that the whole of the material carried may be discharged between the rails upon which the wagon rests the doors are hinged close to and nearly meet at the longitudinal center line of the wagon. The inverted channel-iron with sloping sides forming the crown of the longitudinal ridge is strengthened by having a rolled beam of I-section or a bulb T-beam riveted to the crown and passing inside the wagon and extending the full length of the same, so as to form a support for the cross members of the underframe, which pass beneath this longitudinal member and between the doorways, and also to form a girder that assists the sole-bars or side frames of the wagon underframe in supporting the load and in withstanding the shocks due to drawing and buffing of the wagons. Instead of or in addition to said top beam a rolled bar of any desired form may be arranged, so as to extend longitudinally beneath the cross members of the underframe. In the case of a bogie-wagon this bar may extend from and be securely attached to the cross-bar of the underframe, which passes near the center of the bogie and to which the center plate is attached, and from this point it passes downwardly at an inclination and below deepened cross-bars at the ends of and between the doors and up to the corresponding cross-bar above the bogie toward the other end of the underframe, and to this cross-bar it is securely attached. This lower bar, acting as a tension member or truss-rod and the inverted channel-shaped crown of the longitudinal ridge (strengthened or not) as a compression member, forms a longitudinal girder in the center of the underframe. The space directly below the inverted channel is left clear for the working of the toggles, levers, and worm-gear, all of which are thoroughly protected from material when it is being discharged from the wagons by the inverted channel and wagon-doors. The transverse shaft may be protected by the transverse members located between the doors and which may be provided with a crown-piece of inverted-V section, if desired. The sole-bars or side girders of the under frame are preferably of channel form, with the lower flange set at an angle of forty-five degrees, or thereabout, to the horizon for the full length of the doors or, if preferred, the total length of the frame. This lower flange, with the cross-bars, which follow the same angle, forms the framework of the side hopper or slope from the side of the wagon to the door-openings, inclined floor-plates being secured to this framework.

For discharging the whole of the material clear of or beyond the rails upon which the wagon rests the door-openings in the sides of the longitudinal ridges are arranged as close as possible to the side girders or sole-bars of the underframe. The sole-bars or side girders in this example may be similar to those just referred to, or they may be formed of rolled angles, bulb-angles, head-bars, or other suitable forms, and the middle longitudinal members will preferably be raised above the level of the sole-bars or side girders in order to support the sloping sides of the longitudinal ridge forming the floor of the wagon, which in this case will be of considerable width. The cross-bars might pass from sole-bar to sole-bar, and the middle longitudinal members might pass over and be connected to the cross-bars. The top flange of these longitudinal members would be set at an angle of forty-five degrees, or thereabout, to the horizon, and the two longitudinal members would be connected by special stiffeners, the upper portions of whose sides are carried up at an angle of forty-five degrees, or thereabout, and thus support the inverted trough forming the longitudinal ridge between the two main longitudinal members.

For discharging part of the materials between the rails and part outside the rails upon which the wagon rests there will generally be sufficient space between the door-openings and beneath the center longitudinal ridge to allow of two longitudinal members being placed there, as in the arrangement just described. These longitudinal members and the sole-bars are preferably made in the form of channels, with the lower or tension flanges set at an angle of forty-five degrees with the horizon, or thereabout, the flanges of the sole-bars extending inwardly and those of the middle longitudinal members outwardly in order that the cross-bars, which connect the said longitudinal members to the sole-bars, may have their lower portions formed at the same angle as the lower flanges of the sole-bars and longitudinal members, and thus stiffen the flanges of these members and form the framework upon which are secured inclined floor-plates strengthened, if need be, by angle-bars near their edges. In this example there is sufficient room between the longitudinal members for the working of the toggles and door-operating mechanism.

In any of the above examples the members may be made of stamped-metal plates or rolled-metal bars, and in some cases they may be of timber stiffened by metal; but preferably all would be made of stamped metal.

In order that the hereinbefore-described invention may be clearly understood, illustrative drawings accompany this specification and will now be shortly described.

Figure 16:
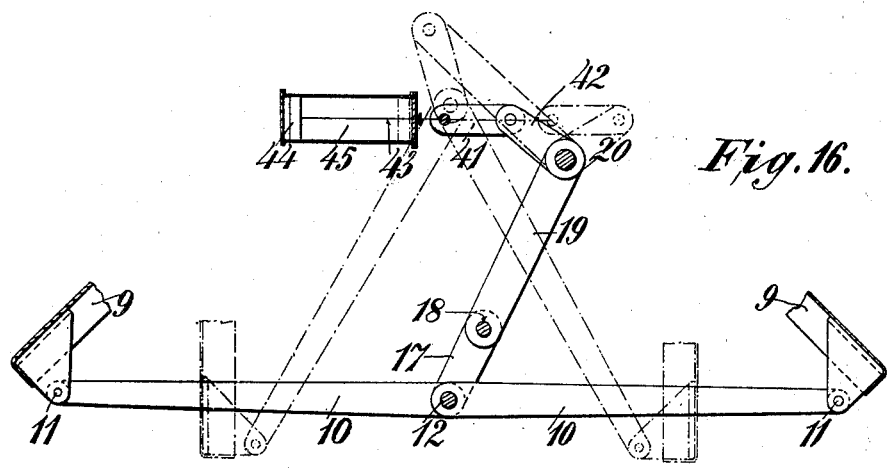

Figure 1 is a side elevation of one half of a wagon of the kind forming the subject of my hereinbefore-mentioned former application for Letters Patent and having some of my present improvements embodied therein. Fig. 2 is a central longitudinal section of the other half. Fig. 3 is a sectional part plan of the longitudinal door-operating mechanism, the plates of the ridges being removed at the upper portion of the figure. Fig. 4 shows the doors and their operating mechanism half in elevation and half in longitudinal section. Fig. 5 is a similar view to Fig. 3, but showing only a portion of the doors and mechanism to a larger scale. Fig. 6 is a transverse section on the line A B, Fig. 5; and Fig. 7 is a longitudinal part section on the line C D, Fig. 6. Figs. 8, 9, and 10 are corresponding views to Figs. 5, 6, and 7, illustrating a wagon with specially-strengthened longitudinal middle ridge having doorways and doors arranged as described, but adapted to discharge the whole of the contents between the rails. Fig. 11 is a diagram illustrating the application to such a wagon of a tension member or truss-rod beneath the cross-bars. Figs. 12, 13, and 14 are corresponding views to Figs. 5, 6, and 7 of a slightly-modified arrangement, whereby the whole of the contents of the wagon can be discharged beyond the rails. Figs. 15 and 16 are diagrammatic views illustrating modifications of door-operating gear.

Referring to Figs. 1 to 7, 1 1 are the vertical side walls of the wagon, and 2 2 the end walls, having doorways 3, closed by doors 4, toward which the floor 5 inclines from a transverse ridge 6 over each bogie. 7 is the longitudinal ridge located at the middle of the width of the wagon, and 8 are four doorways formed in the sides thereof and provided with doors 9, hinged at their upper adjacent edges back to back in pairs, as shown. 10 10 are the toggles, which are vertically moving. To the lower edges of the doors 9 the toggles are coupled by pins 11. The pin 12 of the toggle-knuckles of each pair of doors is provided with collars or rollers 13, which work in slots 14 in plates 15, forming transverse stiffeners to the longitudinal ridge 7, and the said pins 12 are connected by links 17 and pins 18 to lever-arms 19, fixed to the longitudinal rock-shaft 20, which extends the full length of the doorways 8. When the doors are closed, the axes of the pin 12, pins 18, and shaft 2 are in the same plane, so that the mechanism then serves to lock the doors. 21 is the worm-wheel fixed upon the rock-shaft 20, and 22 is the transverse shaft extending from side to side of the wagon and having fixed to it a worm 23, which gears with the worm-wheel 21. Each end of the shaft 22 is shown fitted with a hand-wheel 24; but the ends will generally be squared to receive a crank handle or key whereby the door-operating mechanism can be operated. The positions occupied by the various parts of the mechanism when the doors are open are indicated by dotted lines in Fig. 6. 25 25$^a$ are stops on the shaft 20 and on the underframe, respectively, for the purpose of limiting movement of the parts without strain. 26 26 are ridges which extend laterally from the ridge 7 to the side walls over the transverse shaft 22, which is thereby protected.

The wagon shown in Figs. 1 to 7 is designed so as to be capable of discharging part of its contents between the rails and part beyond them. By partly opening the doors 9 the whole of the contents can be discharged beyond the rails.

In the arrangement illustrated in Figs. 8, 9, and 10 the crown of the longitudinal ridge 7 is formed by an inverted channel-iron 28, having sloping sides, as shown, and is surmounted by a girder composed of a rolled beam 29 of I-section, with a superposed beam 30 of bulb T or rail section. The cross-bars 31 of the underframe pass beneath this girder between and at the ends of the doorways 8. The collars or rollers 13 work in guide-channels 14*. Similar guide-channels may be used in any of the other examples in place of the slots in the transverse members. 32 is a truss rod or bar extending longitudinally beneath the cross-bars 31.

Fig. 11 illustrates diagrammatically the arrangement of this truss rod or bar as applied to a bogie-wagon. The rod or bar is securely attached by brackets 33 to the cross-bars 34 near the bogie-centers and dips below and is attached to the cross members 31.

In all the arrangements 36 represents the sole-bars or side girders of the underframe and are shown as having their lower flanges set at an angle with the horizon. In Figs. 5, 6, and 7 and in Figs. 8, 9, and 10 floor-plates 37, which may be strengthened by angle-bars 37ª, are secured to the framework formed by the sole-bars 36 and the cross-bars 31; but in the arrangement illustrated by Figs. 12, 13, and 14 the doors 9 close against the inclined lower flanges of the sole-bars 36.

38 38, Figs. 6 and 13, are longitudinal members placed beneath the longitudinal ridge. In Fig. 6 the lower flange of each is shown outwardly and downwardly inclined, and the lower parts of the cross-bars 31 connected to them are similarly inclined, while in Fig. 13 their upper flanges incline inwardly and upwardly to the same angle as the sides of the longitudinal ridge 7, which between the longitudinals 38 are supported by special stiffeners 15, the upper portions of whose sides are inclined, as shown, so as to abut against the insides of the longitudinals 38 and of the ridge 7.

The lower flanges of the two opposite cross-bars 31 in Fig. 6 may be connected by a horizontal tie bar or angle 31ª to form a transverse tension member, and thus make them continuous.

The cross-bars 31, which form the retaining-walls for the material at the ends of the doors 9 and which may have riveted to their lower flanges angles or tie-bars 31ª, as shown, and the stiffeners 15 between the longitudinal members 38 together serve to brace and tie together the underframe, so that should any undue proportion of load come upon the longitudinal ridge it will be transmitted to the sole-bars 36, which are in turn stiffened by the lower hopper-plates 37. The outward and downward inclination of the lower flanges of the longitudinal members gives the necessary clearance for the door operating and locking gear.

The sole-bars or side girders of the underframes hereinbefore described may be constructed with vertical upper or compression portions, so as not to interfere with the discharge of the contents of the wagon, instead of being formed with horizontal top flanges, or when made of rolled bar the upper portion may be of bulb-section and when made of pressed plate may be stiffened by a bulb riveted to it.

Fig. 15 illustrates diagrammatically an arrangement in which the transverse shaft 22 instead of having a worm engaging a worm-wheel on the rock-shaft 20 is formed with a screw-thread and is fitted with a trunnion-nut 40, connected by links 41 to an arm 42 on the longitudinal rock-shaft 20.

Fig. 16 illustrates diagrammatically an arrangement wherein the links 41 instead of being connected to a trunnion-nut on the transverse shaft 22 are connected to the rod 43 of the piston 44 of a pneumatic or other power-cylinder 45, which is provided with a valve (not shown) operable through a wire or rod passing from side to side of the wagon, as in the case of a vacuum-brake-release wire.

My present improvements are applicable to bogie and other wagons of types differing from that illustrated in Figs. 1 and 2. Moreover, some of my improvements may be employed without others.

What I claim is—

1. In a hopper-bottom wagon, the combination of a longitudinal ridge in the wagon-bottom, openings formed in the sides of the ridge, doors closing said openings and hinged at their upper edges back to back in pairs and lengthwise of the wagon, vertically-moving toggles pivoted to the lower parts of the doors, a longitudinal rock-shaft, lever-arms fixed upon said rock-shaft and linked to the knuckle of the toggles and means operable from either side of the wagon whereby said rock-shaft can be rocked so as to close and open said doors, as set forth.

2. In a hopper-bottom wagon, the combination of a longitudinal ridge in the wagon-bottom, openings formed in the sides of the ridge, doors closing said openings and hinged at their upper edges back to back in pairs and lengthwise of the wagon, vertically-moving toggles pivoted to the lower parts of the doors, a longitudinal rock-shaft located beneath the ridge and above the toggles, lever-arms fixed upon said rock-shaft and linked to the knuckle of the toggles and means operable from either side of the wagon whereby said rock-shaft can be rocked so as to close and open said doors, as set forth.

3. In a hopper bottom wagon, the combination of a longitudinal ridge in the wagon-bottom, openings formed in the sides of the ridge, doors closing said openings and hinged at their upper adjacent edges back to back in pairs and lengthwise of the wagon and means whereby said doors can be opened or closed and locked from either side of the vehicle, as set forth.

4. In a hopper-bottom wagon, the combination of a longitudinal ridge in the wagon-bottom, openings formed in the sides of the ridge, doors closing said openings and hinged at their upper edges back to back in pairs and lengthwise of the wagon, vertically-moving toggles pivoted to the lower parts of the doors, a longitudinal rock-shaft, lever-arms fixed upon said rock-shaft and linked to the knuckle of the toggles and means for operating the longitudinal rock-shaft from either side of the wagon comprising a transverse shaft extending from side to side of the wagon and geared to the rock-shaft, as set forth.

5. In a hopper-bottom wagon, the combination of a longitudinal ridge in the wagon-bottom, openings formed in the sides of the ridge, doors closing said openings and hinged at their upper edges back to back in pairs and lengthwise of the wagon, vertically-moving toggles pivoted to the lower parts of the doors, a longitudinal rock-shaft, lever-arms fixed upon said rock-shaft and linked to the knuckle of the toggles and means for operating the longitudinal rock-shaft from either side of the wagon comprising a transverse shaft extending from side to side of the wagon and geared to the rock-shaft by a worm and worm-wheel, as set forth.

6. In a hopper-bottom wagon, the combination of a centrally-disposed girder comprising a longitudinal ridge in the wagon-bottom, openings in the sides of the ridge, doors closing said openings and hinged at their upper edges lengthwise of the wagon, sole-bars having inwardly and downwardly inclined lower flanges and cross-bars fitting said sole-bars and connecting them to the central girder, as set forth.

7. In a hopper-bottom wagon, the combination of a centrally-disposed girder comprising a longitudinal ridge in the wagon-bottom, longitudinal members connected to said ridge, openings in the sides of the ridge, doors closing said openings and hinged at their upper edges lengthwise of the wagon, sole-bars having inwardly and downwardly inclined lower flanges and cross-bars fitting said sole-bars and connecting them to the central girder, as set forth.

8. In a hopper-bottom wagon, the combination of a centrally-disposed girder comprising a longitudinal ridge in the wagon-bottom, openings in the sides of the ridge, doors closing said openings and hinged at their upper edges lengthwise of the wagon, sole-bars having inwardly and downwardly inclined lower flanges and cross-bars at the ends of the doors and forming retaining-walls for the material during discharge, said cross-bars fitting said sole-bars and connecting them to the central girder, as set forth.

9. In a hopper-bottom wagon having a longitudinal ridge in the wagon-bottom, an underframe comprising a centrally-arranged girder formed by said ridge which forms a compression member, sole-bars, cross-bars between them and a tension member which dips below the cross-bars and is attached thereto, as set forth.

10. A hopper-bottom wagon having a longitudinal ridge in the wagon-bottom strengthened by a superposed beam or girder and provided with longitudinally-hinged doors, as set forth.

11. A hopper-bottom wagon having a longitudinal ridge in the wagon-bottom and an underframe comprising sole-bars having downwardly and inwardly inclined lower flanges, longitudinal members beneath the ridge and having downwardly and outwardly inclined lower flanges, cross-bars with correspondingly-inclined lower portions fitting between the sole-bars and longitudinal members and transverse stiffeners between the longitudinal members, as set forth.

Signed at Leeds, in the county of York, England, this 29th day of April, 1903.

JAMES THOMAS JEPSON.

Witnesses:
  W. JAMES COUSINS,
  OSWALD STEPHENSON.